United States Patent
Reiss

(10) Patent No.: US 6,908,219 B1
(45) Date of Patent: Jun. 21, 2005

(54) OPTICAL ELEMENT FOR A HIGH MOUNTED STOP LAMP WITH AN LED LIGHT SOURCE

(75) Inventor: Benoit M. Reiss, Columbus, IN (US)

(73) Assignee: Valeo Sylvania LLC, Seymour, IN (US)

(*) Notice: Subject to any disclaimer, the term of this patent is extended or adjusted under 35 U.S.C. 154(b) by 27 days.

(21) Appl. No.: 10/812,209

(22) Filed: Mar. 29, 2004

(51) Int. Cl.[7] ............................................ F21V 5/00
(52) U.S. Cl. ...................... 362/338; 362/335; 362/26
(58) Field of Search ............................ 362/26, 31, 326, 362/327, 329, 334, 335, 336, 337, 338, 340, 362/800

(56) References Cited

U.S. PATENT DOCUMENTS

| | | | | |
|---|---|---|---|---|
| 851,496 A | * | 4/1907 | Churchill | 362/337 |
| 2,254,961 A | * | 9/1941 | Harris | 362/327 |
| 4,583,151 A | * | 4/1986 | Nagel | 362/340 |
| 5,775,792 A | * | 7/1998 | Wiese | 362/340 |
| 2004/0076010 A1 | * | 4/2004 | Kuo | 362/31 |

* cited by examiner

Primary Examiner—Y. My Quach-Lee
(74) Attorney, Agent, or Firm—William E. Meyer

(57) ABSTRACT

An optical element for use in a high mounted stop lamp is formed with an LED light source mounted on a backing plate. The LED faces in a first direction to emit light towards a field to be illuminated. A light transmissive dome encloses the LED light source, the dome having refractive elements directing at least some light emitted by the LED in a second direction transverse to the first direction. At least one light guide is positioned adjacent the dome to receive light emitted by the LED that is refracted transversely by the refractive dome elements. The light guide includes light directing elements to redirect the transversely directed light towards the field to be illuminated. In this way the ineffectively directed light is recaptured and directed expand the lamp's area image to comply with legal requirements.

11 Claims, 1 Drawing Sheet

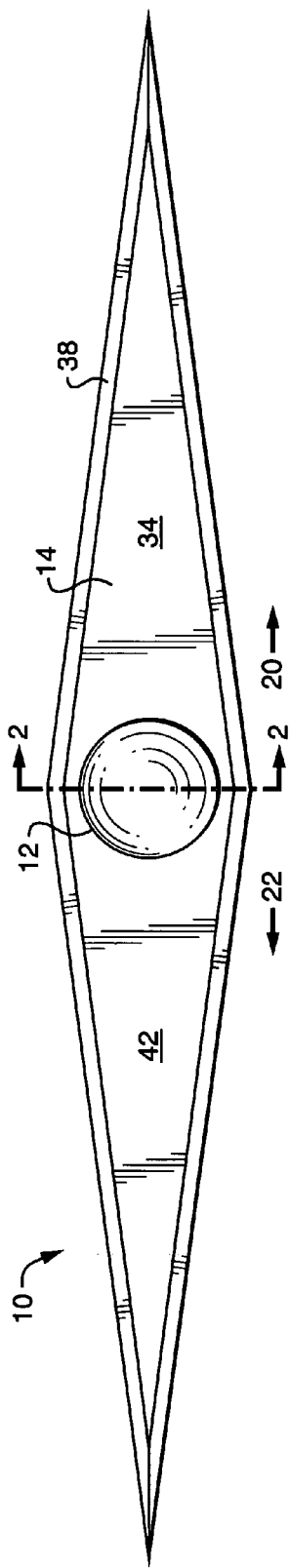
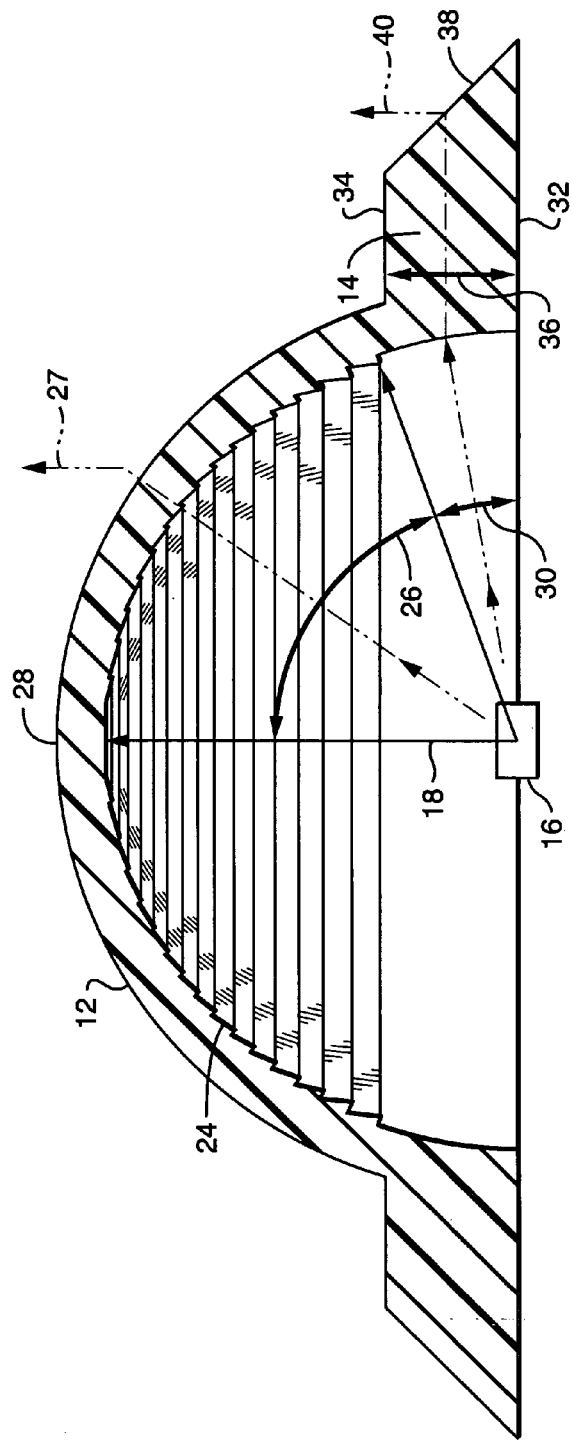

OPTICAL ELEMENT FOR A HIGH MOUNTED STOP LAMP WITH AN LED LIGHT SOURCE

BACKGROUND OF THE INVENTION

1. Field of the Invention

The invention relates to electric lamps and particularly to electric lamps using LEDs as light sources. More particularly the invention is concerned with optical element for use in a vehicle high mounted stop lamp with an LED as a light source.

2. Description of the Related Art Including Information Disclosed under 37 CFR 1.97 and 1.98

Current LED based center high mounted stop lamps (CHMSLs) use from 4 to 24 LED's depending on the their efficiency. The lamp cost is substantially determined by the number of LEDs used, so there is a need to reduce the number of LED needed in the lamp. One LED would be ideal. On the other hand there is a legal requirement that the available light from the CHMSL be dispersed over an area. This is so that viewers are not blinded by a point source, and also to assure human detection and shorten the response time, results that occur with a large area of illumination. There is then a need to meet the minimal standards for area and illumination for CHMSLs.

A simple solution is to install a single bright LED in a parabolic reflector. The depth and diameter of the reflector would be substantial, and therefore impractical for the typical preferred mounting sites on the window or in the vehicle body wall. The main problem is the depth required for such a design. There is then a need for relatively flat optical element that functions as a CHMSL.

BRIEF SUMMARY OF THE INVENTION

An optical element for use in an LED illuminated high mounted stop lamp may be constructed as a light transmissive dome defining a cavity having an axis extending in a forward direction, the cavity having sufficient volume to enclose an LED light source, the dome having refractive elements directing a first portion of the light emitted from an axially located LED in a direction generally parallel to the forward direction, and otherwise towards a field to be illuminated; and at least one light guide positioned adjacent the dome to receive a second portion of the light emitted by the LED, the light guide extending transversely to the axis and including one or more light directing elements offset from the dome in the direction transverse to the axis to redirect the second portion of light transversely, generally parallel to the forward direction and otherwise to the field to be illuminated.

BRIEF DESCRIPTION OF THE SEVERAL VIEWS OF THE DRAWINGS

FIG. 1 shows a front view of an optical element for use in a center high mounted stop lamp (CHMSL) using a single LED light source.

FIG. 2 shows a cross sectional view of the preferred optical element of FIG. 1.

DETAILED DESCRIPTION OF THE INVENTION

An optical element 10 for use in a high mounted stop lamp may be made with a light transmissive dome 12, and a side mounted lightguide 14.

The optical element is designed to receive a centrally located LED 16. The LED is to be located on the axis 18 of the dome 12 and is expected to emit light radially in the direction of the dome 12 and the lightguide 14. A single LED light source must provide sufficient light to illuminate the cross sectional area of the dome 12 and the lightguide 14 to 25 candelas or more, while the combined areas of the dome 12 and lightguide 14, when viewed axially must have an area of 2904 square millimeters or more. The LED may be mounted on a supporting circuit board or back plate. The backplate may include electrical connections for electrically joining the LED light source to a power supply, and mechanical connections or guides for positioning and closing with cover lens, the optical element, or other elements as may be convenient. The optical element may be sandwiched between the cover lens and the backplate by methods known in the art.

The LED light source 12 is to be centrally enclosed by a light transmissive dome 12. The dome 12 has axis 18 that points generally in a forward direction to the field to be illuminated. The dome 12 has a rightside direction 20 and a leftside direction 22, each side direction 20, 22 being transverse to the axis 18 and in opposite directions one from the other. The dome 12 further having refractive features to disperse light received from the LED 16 in the proper directions to the field to be illuminated. The preferred dome 12 is molded plastic (clear or colored, for example red) as may be convenient. The preferred dome 12 is molded with refractive facets formed in the interior surface to direct the received light in the proper directions. The preferred dome 12 is molded with Fresnel type bands 24 formed on the interior surface of the dome 12. In a first region 26, from the crown 28 of the dome 12 (90 degrees) to about 30 degrees, the facets are designed to direct a first portion of light from the LED 12 generally in a forward direction 27 in a relatively narrow beam. It is understood that there may be a spread angle from the absolutely parallel to the axis, but such spread light is otherwise in the direction of the field to be illuminated.

In a second region 30 about from 30 degrees to 0 degrees from the side directions (20, 22), the dome wall (with or without facets) is designed to direct, or transmit a second portion of the light from the LED 16 to be approximately transverse to the axis 18, and to otherwise generally parallel the rightside direction 20 or the leftside direction 22 as the case may be. Again, it is understood there may be some spread from absolutely parallel.

Abutting along the exterior of the dome 12, or co-formed with the dome 12 is at least one lightguide 14. The lightguide 14 is positioned to receive light from the exterior or side of the dome 12 in the second region. The lightguide 14 may be a flat plate of light transmissive material, having a rear wall 32 and a forward wall 34 defining a sufficient thickness 36 to cover the region 30 of the emitted light from the dome 12 exterior along the second projection region 30. The exterior edge of the lightguide 14 is defined by one or more sidewalls 38. In a preferred embodiment two sidewalls and a diameter of the dome define a sharply point isosceles triangle when viewed axially, FIG. 1. The lightguide then extends sideways from the dome 12.

The lightguide 14 is manufactured to have a number to light reflecting elements, which may be polished or coated sidewalls, or similar reflective edge features. In the preferred embodiment the sidewalls 38 have refractive features to project the second portion of the light, that portion received by the lightguide 14, in forward direction 40, or otherwise towards the field to be illuminated. For example the sidewalls 38 may be beveled. The beveled sidewalls 38 then produce a relatively strong outline for the lightguide 14 image. The lightguide 14 may also be formed with internal or rear wall 32 light reflecting features or a combination thereof so that a large portion if not all of the light received from the dome 12 into the lightguide is reflected forward, generally in the direction of the field to be illuminated. The preferred rear wall 32 is formed with a diffusing surface, which may be a roughened surface, a stair casing or a hill and valley type structure. Such light diffusing features are known in the art of lightguides. The particular diffusing surface is felt to be a matter of design choice. It is only relevant that the second portion of light generally be reflected forward 40. The lightguide 14 may also be formed with a narrowing of the plate thickness 36 to progressively subject the received second portion of light to successive diffusing features. The image of the lightguide 14 as viewed axially from the field to be illuminated may have any convenient shape. It is only expected that the dome 12 and lightguide 14 in cross-section have sufficient cross-sectional area to meet or exceed the standard for image area size. The current images size required in the United States for CHMSLs is 2904 millimeters square. In the preferred embodiment, the lightguide has right and left side sections that are symmetric, with each approximately the shape of an elongated (high aspect) isosceles triangle. Their respective base sides are carved out to abut or merge with a perimeter of the dome. The rightside lightguide 14 is positioned adjacent the rightside of the dome 12 to receive light emitted by the LED 12. The lightguide 14 may be mechanically butted to the exterior of the dome 12 or may be co-formed with the dome 12 as a common plastic molding, either in clear or colored plastic. Co-forming the pieces increases light transmission by eliminating reflection surfaces.

A similar leftside lightguide 42 may be positioned adjacent the leftside of the dome 12 to receive light emitted by the LED that is directed transversely from the dome 12 in the left direction. The leftside lightguide 42 including light directing elements redirect leftside refracted light towards the field to be illuminated. In this way, the rightside and leftside lightguides (14, 42) may be symmetric wings on each side of the central dome 12. It is understood that the right and leftside lightguides (14, 42) may be rectangular or have other convenient shapes providing and illuminated, approximately rectangular or lozenge shape image with the dome 12 forming the center region of the image. The resulting CHMSL then has an elongated, rectangular form that may be mounted in the horizontal direction, providing the proper illumination and image size while being substantially flat or having a minimal overall thickness, and requiring only one LED for the illumination.

The dome 12 and the lightguide may be captured between a cover lens and a backplate. Appropriate conforming steps, ledges, bosses or similar coupling features may be formed on the interiors of the cover lens and backplate to locate and capture the lightguide in proper position. In one embodiment the optical element was made from a clear plastic and had the form two elongated triangles butted to a central dome. The overall dimensions were 37.6 cm wide, 5 cm high and about 1.9 cm thick. The dome had a 3.3 cm outside diameter, a 2.9 centimeter inside diameter, with 16 Fresnel facet bands. The Fresnel bands extended from the peak of the dome over an angle of about 70 degrees. The lightguide portion was co-molded with the dome and had a thickness of 0.5 cm. The outside walls of the lightguide portion were beveled at 45 degrees. The back wall was frosted.

While there have been shown and described what are at present considered to be the preferred embodiments of the invention, it will be apparent to those skilled in the art that various changes and modifications can be made herein without departing from the scope of the invention defined by the appended claims.

What is claimed is:

1. An optical element for use in an LED illuminated high mounted stop lamp comprising:
   a light transmissive dome defining a cavity having an axis extending in a forward direction, the cavity having sufficient volume to enclose an LED light source, the dome having refractive elements directing a first portion of the light emitted from an axially located LED in a direction generally parallel to the forward direction, and otherwise towards a field to be illuminated;
   at least one light guide positioned adjacent the dome to receive a second portion of the light emitted by the LED, the light guide extending transversely to the axis and including one or more light directing elements offset from the dome in the direction transverse to the axis to redirect the second portion of light transversely, generally parallel to the forward direction and otherwise to the field to be illuminated,
   wherein the lightguide has the form of a plate extending transversely to the axis, the plate having approximately parallel rear and forward walls and one or more side walls, and
   wherein sidewalls refract at least a portion of the second portion of light in the forward direction.

2. The optical element in claim 1, wherein sidewalls are beveled to refract at least a portion of the second portion of light in the forward direction.

3. The optical element in claim 1, wherein the dome and light guide are a single mechanically unit.

4. The optical element in claim 1, wherein a second light guide extends from the dome, and the second light guide extend diametrically away from the first light guide.

5. An optical element for use in an LED illuminated high mounted stop lamp comprising:
   a light transmissive dome defining a cavity having an axis extending in a forward direction, the cavity having sufficient volume to enclose an LED light source, the dome having refractive elements directing a first portion of the light emitted from an axially located LED in a direction generally parallel to the forward direction, and otherwise towards a field to be illuminated;
   at least one light guide positioned adjacent the dome to receive a second portion of the light emitted by the LED, the light guide extending transversely to the axis and including one or more light directing elements offset from the dome in the direction transverse to the axis to redirect the second portion of light transversely, generally parallel to the forward direction and otherwise to the field to be illuminated
   wherein the thickness between the forward wall and rear wall of the plate covers a region of the dome that defines a projected angle from the LED to the dome of approximately 30 degrees.

6. An optical element for use in an LED illuminated high mounted stop lamp comprising:
   a light transmissive dome defining a cavity having an axis extending in a forward direction, the cavity having sufficient volume to enclose an LED light source, the dome having refractive elements directing a first portion of the light emitted from an axially located LED in a direction generally parallel to the forward direction, and otherwise towards a field to be illuminated;

at least one light guide positioned adjacent the dome to receive a second portion of the light emitted by the LED, the light guide extending transversely to the axis and including one or more light directing elements offset from the dome in the direction transverse to the axis to redirect the second portion of light transversely, generally parallel to the forward direction and otherwise to the field to be illuminated wherein sidewalls of the light guide with a diameter of the dome define a triangle when viewed axially.

7. The optical element in claim 6, wherein the Fresnel bands are on the interior side of the dome.

8. The optical element in claim 7, wherein the Fresnel bands encircle the axis and extend from the intersection of the axis with the dome, down along the dome surface to a point having an angle of 60 degrees or more with the axis from the center point of the location for the LED.

9. The optical element in claim 7, wherein the Fresnel bands encircle the axis and extend from the intersection of the axis with the dome, down along the dome surface to a point where the plane of the forward surface of the light guide intersects the dome interior.

10. An optical element for use in an LED illuminated high mounted stop lamp comprising:

a light transmissive dome having an interior side defining a cavity having an axis extending in a forward direction, the cavity having sufficient volume to enclose an LED light source, the dome having refractive elements directing a first portion of the light emitted from an axially located LED in a direction generally parallel to the forward direction, and otherwise towards a field to be illuminated;

at least one light guide positioned adjacent the dome to receive a second portion of the light emitted by the LED, the light guide extending transversely to the axis and including one or more light directing elements offset from the dome in the direction transverse to the axis to redirect the second portion of light transversely, generally parallel to the forward direction and otherwise to the field to be illuminated, and wherein the refractive elements include Fresnel band facets.

11. An optical element for use in an LED illuminated high mounted stop lamp comprising:

a light transmissive hemispherical dome for enclosing a centrally positioned LED light source, the dome being axially oriented around a forward axial direction and having a rightside and a leftside each being transverse to the forward direction and in opposite directions one from the other, the dome further having refractive bands encircling the dome adjacent a diametric plane, the refractive bands being molded in an interior of the surface of the dome, the refractive bands directing at least some light emitted by the LED in the forward direction;

a rightside light guide positioned adjacent the rightside of the dome to receive light emitted by the LED that is passed transversely from the dome in the right direction, the rightside light guide including light directing elements to redirect the receive light generally in the forward direction; and a leftside light guide positioned adjacent the leftside of the dome to receive light emitted by the LED that is passed transversely from the dome in the left direction, the leftside light guide including light directing elements to redirect the received light generally in the forward direction.

* * * * *